United States Patent
Hall et al.

(10) Patent No.: US 8,817,597 B2
(45) Date of Patent: Aug. 26, 2014

(54) EFFICIENT TRIPLE MODULAR REDUNDANCY ON A BRAIDED RING

(75) Inventors: Brendan Hall, Eden Prairie, MN (US); Kevin R. Driscoll, Maple Grove, MN (US); Michael Paulitsch, Columbia Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 494 days.

(21) Appl. No.: 11/935,343

(22) Filed: Nov. 5, 2007

(65) Prior Publication Data

US 2009/0116502 A1 May 7, 2009

(51) Int. Cl.
- *G06F 11/00* (2006.01)
- *H04L 12/437* (2006.01)
- *G06F 11/18* (2006.01)
- *G06F 11/20* (2006.01)

(52) U.S. Cl.
CPC ............ *H04L 12/437* (2013.01); *G06F 11/202* (2013.01); *G06F 11/182* (2013.01); *G06F 11/2007* (2013.01)
USPC ............ 370/222; 370/458; 709/251; 714/819

(58) Field of Classification Search
None
See application file for complete search history.

(56) References Cited

U.S. PATENT DOCUMENTS

| | | |
|---|---|---|
| 4,417,334 A | 11/1983 | Gunderson et al. |
| 4,428,046 A | 1/1984 | Chari et al. |
| 4,630,254 A | 12/1986 | Tseng |

(Continued)

FOREIGN PATENT DOCUMENTS

| | | |
|---|---|---|
| AT | 407582 B | 4/2001 |
| DE | 3238692 | 4/1984 |

(Continued)

OTHER PUBLICATIONS

European Patent Office, "European Search Report", Mar. 11, 2009, Published in: EP.

(Continued)

*Primary Examiner* — Brian Roberts
(74) *Attorney, Agent, or Firm* — Fogg & Powers LLC

(57) ABSTRACT

One embodiment comprises a network that includes a plurality of bi-directional links and a plurality of nodes. Each node is communicatively coupled to two neighbor nodes and to two skip nodes using the plurality of bi-directional links. Three neighboring nodes of the plurality of nodes form a triple modular redundant (TMR) set having a first end node, a second end node, and a center node, the first end node configured to transmit output data in a first direction and the second end node configured to transmit output data in a second direction. At least one of the plurality of nodes that is not in the redundant set determines the integrity of data received from the redundant set based on at least: (i) a comparison of data received on a first logical communication channel from a respective first neighbor node with data received on the first logical communication channel from a respective first skip node; (ii) a comparison of data received on a second logical communication channel from a respective second neighbor node with data received on the second logical communication channel from a respective second skip node; and (iii) a comparison of data received on the first logical communication channel from one of the respective first neighbor node and the respective first skip node with data received on the second logical communication channel from one of the respective second neighbor node and the respective second skip node.

20 Claims, 8 Drawing Sheets

(56) References Cited

U.S. PATENT DOCUMENTS

| | | | |
|---|---|---|---|
| 4,631,718 A | 12/1986 | Miyao | |
| 4,740,958 A | 4/1988 | Duxbury et al. | |
| 4,856,023 A | 8/1989 | Singh | |
| 4,866,606 A | 9/1989 | Kopetz | |
| 4,907,232 A | 3/1990 | Harper et al. | |
| 5,161,153 A | 11/1992 | Westmore | |
| 5,257,266 A | 10/1993 | Maki | |
| 5,307,409 A | 4/1994 | Driscoll | |
| 5,341,232 A | 8/1994 | Popp | |
| 5,386,424 A | 1/1995 | Driscoll et al. | |
| 5,557,778 A | 9/1996 | Vaillancourt | |
| 5,896,508 A | 4/1999 | Lee | |
| 5,903,565 A | 5/1999 | Neuhaus et al. | |
| 6,052,753 A | 4/2000 | Doerenberg et al. | |
| 6,141,769 A * | 10/2000 | Petivan et al. | 714/10 |
| 6,226,676 B1 | 5/2001 | Crump et al. | |
| 6,247,143 B1 * | 6/2001 | Williams | 714/11 |
| 6,374,078 B1 | 4/2002 | Williams et al. | |
| 6,513,092 B1 | 1/2003 | Gorshe | |
| 6,550,018 B1 * | 4/2003 | Abonamah et al. | 714/6 |
| 6,594,802 B1 | 7/2003 | Ricchetti et al. | |
| 6,618,359 B1 | 9/2003 | Chen et al. | |
| 6,707,913 B1 | 3/2004 | Harrison et al. | |
| 6,760,768 B2 | 7/2004 | Holden et al. | |
| 6,842,617 B2 | 1/2005 | Williams et al. | |
| 6,910,173 B2 * | 6/2005 | Mitra et al. | 714/760 |
| 6,925,497 B1 | 8/2005 | Vetrivelkumaran et al. | |
| 6,956,461 B2 | 10/2005 | Yoon et al. | |
| 7,047,440 B1 * | 5/2006 | Freydel et al. | 714/11 |
| 7,050,395 B1 | 5/2006 | Chow et al. | |
| 7,085,560 B2 | 8/2006 | Petermann | |
| 7,088,921 B1 | 8/2006 | Wood | |
| 2002/0027877 A1 | 3/2002 | Son et al. | |
| 2002/0087763 A1 | 7/2002 | Wendorff | |
| 2005/0129038 A1 * | 6/2005 | Hall et al. | 370/404 |
| 2005/0132105 A1 | 6/2005 | Hall et al. | |

FOREIGN PATENT DOCUMENTS

| | | |
|---|---|---|
| DE | 19633744 | 2/1998 |
| DE | 20220280 | 11/2003 |
| EP | 0405706 | 2/1990 |
| EP | 1271854 | 1/2003 |
| EP | 1280024 | 1/2003 |
| EP | 1280312 | 1/2003 |
| EP | 1365543 | 11/2003 |
| EP | 1398710 | 3/2004 |
| EP | 1469627 | 10/2004 |
| GB | 2028062 | 2/1980 |
| GB | 1581803 | 12/1980 |
| GB | 2175775 | 12/1986 |
| WO | 0064122 | 10/2000 |
| WO | 2006063237 | 6/2006 |
| WO | 2007005818 | 1/2007 |

OTHER PUBLICATIONS

Prizant J. et al., "High Speed Communicator for Fault Tolerant Systems", "Digital Avionics Systems Conference Proceedings", 1998, Publisher: IEEE.
Shi, Fong and Art Brockschmidt, "Fault Tolerant Distributed Power", "Conference Proceedings", 1996, pp. 671-677, Publisher: Applied Power Electronics Conference and Exposition.
Al-Rousan et al., "The Two-Processor Reliability of Hierarchical Larg-Scale Ring-Based Networks", "Proceedings of the 29th Hawaii International Conference on System Sciences", 1996, pp. 63-71.
"Backplane Data Bus Arinc Specification 659", Dec. 1993, pp. 1-132, Publisher: Arinc.
Avizienis, "A Fault Tolerance Infrastructure for Dependable Computing With High-Performance Cots Componenets", "Conference Proceedings on Dependable Systems and Networks", Jun. 2000, pp. 492-500, Publisher: IEEE, Published in: New York, NY.
Bauer et al., "Assumption Coverage Under Different Failure Modes in the Time-Triggered Architecture", "8th IEEE International Conference on Emerging Technologies and Factory Automation", Oct. 2001, pp. 333-341, Publisher: IEEE.
Bauer et al., "Transparent Redundancy in the Time-Triggered Architecture", "Proceedings of the Conference on Dependable Systems and Networks", 2000, pp. 5-13, Publisher: IEEE.
Bauer et al., "The Central Guardian Approach to Enforce Fault Isolation in a Time-Triggered System", "Proceedings of Symposium on Autonomous Decentralized Systems", Apr. 2003, pp. 37-44, Publisher: IEEE.
Bosch, "Can Specification Version 2.0", "SAE Handbook—Parts and Components", 1998, pp. 1-72, vol. 2, Publisher: Society of Automotive Engineers.
D'Luna, "A Single-Chip Universal Cable Set-Top Box/Modern Transceiver", "Journal of Sold-State Circuits", Nov. 1998, pp. 1647-1660, vol. 34, No. 11, Publisher: IEEE.
Driscoll et al., "The Real Byzantine Generals", "Proceedings of Digital Avionics System Conference", Oct. 2004, pp. 6.D.4-1-6.D.4-11, Publisher: IEEE.
Brinkmeyer, "Flexray International Workshop Slides", "www.flexray-group.com", Apr. 2002, pp. 1-356, Publisher: Flexray.
"Flexray Communication System: Protocol Specification Version 2.1 Revision A", "www.flexray-group.com", Mar. 2006, pp. 1-8, Publisher: Flexray Consortium.
"Preliminary Node-Local Bus Guardian Specification Version 2.0.9", Dec. 2005, pp. 1-75, Publisher: Flexray Consortium.
"Preliminary Central Bus Guardian Specification Version 2.0.9", Dec. 2005, pp. 1-38, Publisher: Flexray Consortium.
Grnarov et al., "A Highly Reliable Distributed Loop Network Architecture", "Proceedings of Fault-Tolerant Computing Symposium", Jun. 1980, pp. 319-324, Publisher: IEEE.
Gruenbacher, "Fault Injection for TTA", 1999, Publisher: Information Society Technologies.
Hall et al., "Ringing Out Fault Tolerance a New Ring Network for Superior Low-Dost Dependabilitiy", "International Conference on Dependable Systems and Networks (DSN'05)", 2005, pp. 298-307.
Hammett et al., "Achieving 10-9 Dependability With Drive-By-Wire Systems", "SAE World Congress", 2003, pp. 534-547, vol. 112, No. 7, Publisher: Society of Automotive Engineers.
Hopper et al., "Design and Use of an Integrated Cambridge Ring", "Journal on Selected Areas in Communications", Nov. 2003, pp. 775-784, vol. 1, No. 5, Publisher: IEEE.
Hoyme et al., "SAFEbus", "Proceedings of the Digital Avionics Systems Conference", Oct. 1992, pp. 68-73, Publisher: IEEE.
Hoyme et al., "SAFEbus", "IEEE Aerospce and Electronics Systems Magazine", Mar. 1993, pp. 34-39, vol. 8, No. 3, Publisher: IEEE.
Huber et al., "Silk: An Implementation of a Buffer Insertion Ring", "Journal on Selected Areas in Communications", Nov. 1983, pp. 766-774, vol. 1, No. 5, Publisher: IEEE.
Hwang et al., "Survival Reliability of Some Double-Loop Networks and Chordal Rings", "Transactions on Computers", 1995, pp. 1468-1471, vol. 44, No. 12, Publisher: IEEE.
"Internet Content Adaptation", "Network Appliance", Jul. 2001, pp. 1-13.
IEEE Computer Society, "1149.6 IEEE Standard for Boundary-Scan Testing of Advanced Digital Networks", Apr. 17, 2003, pp. 1-139, Publisher: IEEE, Published in: New York, NY.
Johansson et al., "On Communication Requirements for Control-By-Wire Applications", "Proceedings of System Safety Conference", Aug. 2003, pp. 1123-1132.
Kanoun et al., "Dependability Evaluation of Bus and Ring Communication Topologies for the Delta-4 Distr Fault-Tolerant Architecture", "Proceedings of the Symposium on Reliable Distributed Systems", 1991, pp. 130-141, Publisher: IEEE.
Kieckhafer et al., "The Maft Architecture for Distributed Fault Tolerance", "Transactions on Computers", 1988, pp. 398-405, vol. 37, No. 4, Publisher: IEEE.
Kopetz et al., "TTP—A Protocol for Fault-Tolerant Real-Time Systems", "Computer", Jan. 1194, pp. 14-23, vol. 27, No. 1, Publisher: IEEE Computer Society, Published in: Long Beach, CA.
Liu et al., "The Distributed Double-Loop Computer Network (DDLCN)", "ACM '80 Proceedings of the ACM 1980 Annual Conference", 1980, pp. 164-178, Publisher: ACM.

(56) References Cited

OTHER PUBLICATIONS

Lonn, "Initialsynchronization of TDMA Communication in Distributed Real-Time Systems", "Conference on Distributed Computing Systems", 1999, pp. 370-379, Publisher: IEEE.

Nayak et al., "Ring Reconfiguration in Presence of Close Fault Cuts", "Proceedings of Hawaii International Conference on System Science", 1996, pp. 422-428, Publisher: IEEE.

Paulitsch et al., "Cverage and the Use of Cyclic Redundancy Codes in Ultra-Dependable Systems", "2005 International Conference on Dependable Systems and Networks (DSN'05)", 2005, pp. 346-355.

Poledna et al., "Replica Determinism and Flexible Scheduling in Hard Real-Time Dependable Systms", "IEEE Transactions on Computers", Feb. 2000, pp. 100-111, vol. 49, No. 2, Publisher: IEEE.

Poledna, "Replica Determinism in Distributed Real-Time Systems: A Brief Survey", "Real-Time Systems", 1994, pp. 289-316, vol. 6.

"Software Considerations in Airborne Systems and Equipment Certification", "http://www.rtca.org", Dec. 1992, pp. 1-112, Publisher: RTCA.DO-178b.

Rushby, "Bus Architectures for Safety-Critical Embedded Systems, Embedded Software", "Proceedings of 1st International Workshop on Embedded Software, Notes in Computer Science", Oct. 2001, pp. 306-323, vol. 2211, Publisher: Springer-Verlag, Published in: Germany.

Saltzer et al., "Why a Ring", "Proceedings of Symposium on Data Communications", 1981, pp. 211-217, Publisher: IEEE.

Sivencrona et al., "Protocol Membership Agreement in Distributed Communicaiton System—A Question of Brittleness", "SAE World Congress, Paper No. 2003-01-0108", 2003, pp. 1-6, Publisher: Society of Automotive Engineers Inc.

Steiner et al., "The Startup Problem in Fault-Tolerant Time-Triggered Communication", "International Conference on Dependable Systems and Networks (DSN'06)", 2006, pp. 35-44.

Steiner et al., "The Transition From Asynchronous to Synchronous System Operation: An Approach From Distributed Fault-Tolerant Systems", "Proceedings of Conference on Distributed Computing Systems", Jul. 2002, pp. 329-336, Publisher: IEEE.

Sundaram et al., "Controller Integrity in Automotive Failsafe System Architectures", "2006 SAE World Congress", 2006, pp. 1-10, Publisher: SAE International.

Tomlinson et al., "Extensible Proxy Services Framework", Jul. 2000, pp. 1-13, Publisher: Internet Society.

"Time-Triggered Protocol TTP/C", 2004, Publisher: TTTECH Computertechnik GmbH, Published in: Austria.

Wensley et al., "The Design, Analysis, and Verification of the Sift Fault Tolerant System", "Proceedings of Conference on Software Engineering", 1976, pp. 458-469, Publisher: IEEE Computer Society Press.

Yeh, "Design Condiserations in Boeing 777 Fly-By-Wire Computers", "High-Asssurance Systems Engineering Symposium", Nov. 1998, pp. 64-72, Publisher: IEEE.

Yeh, "Triple-Triple Redundant 777 Primary Flight Computer", "Proceedings of the Aerospace Applications Conference", 1996, pp. 293-307, vol. 1, Publisher: IEEE, Published in: New York, NY.

\* cited by examiner

|        | Node A | Node B | Node C | Voted Output |
|--------|--------|--------|--------|--------------|
| Bit #1 | 1      | 1      | 1      | 1            |
| Bit #2 | 0      | 0      | 0      | 0            |
| Bit #3 | 1      | 1      | 0      | 1            |
| Bit #4 | 0      | 0      | 0      | 0            |
| Bit #5 | 1      | 1      | 1      | 1            |

Fig. 4

EFFICIENT TRIPLE MODULAR REDUNDANCY ON A BRAIDED RING

CROSS REFERENCE TO RELATED APPLICATIONS

This application is related to U.S. patent application Ser. No. 10/993,933 (U.S. Pat. No. 7,606,179), filed Nov. 19, 2004 entitled "HIGH INTEGRITY DATA PROPAGATION IN A BRAIDED RING", hereby incorporated herein by reference, and referred to herein as the "'933 application".

This application is related to co-pending U.S. patent application Ser. No. 11/537,305, filed on Sep. 29, 2006, entitled "SYSTEMS AND METHODS FOR FAULT-TOLERANT HIGH INTEGRITY DATA PROPAGATION USING A HALF-DUPLEX BRAIDED RING NETWORK", hereby incorporated herein by reference, and referred to herein as the "'305 Application".

This application is related to U.S. patent application Ser. No. 11/010,249 (U.S. Pat. No. 7,372,859), filed Dec. 10, 2004 entitled "SELF-CHECKING PAIR ON A BRAIDED RING NETWORK", hereby incorporated herein by reference, and referred to herein as the "'249 application".

BACKGROUND

Fail-operational systems often use a Triple Modular Redundant (TMR) configuration. Traditionally, however, time division multiple access (TDMA) based TMR configurations require extensive overhead in the form of interstages and/or software overhead to perform the voting that is done in connection with selecting a TMR output. In addition, TDMA-based TMR configurations often use multiple TDMA slots/transmissions to share or observe the output from each member of the TMR set.

SUMMARY

One embodiment comprises a network that includes a plurality of bi-directional links and a plurality of nodes. Each node is communicatively coupled to two neighbor nodes and to two skip nodes using the plurality of bi-directional links. Three neighboring nodes of the plurality of nodes form a triple modular redundant (TMR) set having a first end node, a second end node, and a center node, the first end node configured to transmit output data in a first direction and the second end node configured to transmit output data in a second direction.

In another embodiment, a network comprises a plurality of nodes communicatively coupled to one another over first and second logical communication channels. Each of the plurality of nodes is communicatively coupled to respective first and second neighbor nodes and respective first and second skip nodes. The plurality of nodes comprises a redundant set of nodes comprising at least three nodes. When the redundant set transmits first data: (A) the redundant set transmits the first data on both the first and second logical communication channels; (B) each of the plurality of nodes that is not in the redundant set forwards along the first logical communication channel any data received on the first logical communication channel from a respective first neighbor node and forwards along the second logical communication channel any data received on the second logical communication channel from a respective second neighbor node; and (C) at least one of the plurality of nodes that is not in the redundant set determines the integrity of data received from the redundant set based on at least: (i) a comparison of data received on the first logical communication channel from a respective first neighbor node with data received on the first logical communication channel from a respective first skip node; (ii) a comparison of data received on the second logical communication channel from a respective second neighbor node with data received on the second logical communication channel from a respective second skip node; and (iii) a comparison of data received on the first logical communication channel from one of the respective first neighbor node and the respective first skip node with data received on the second logical communication channel from one of the respective second neighbor node and the respective second skip node.

DRAWINGS

FIG. 4 is a chart of one embodiment of voting comparisons in a triple modular redundant set.

DETAILED DESCRIPTION

Figure 1:
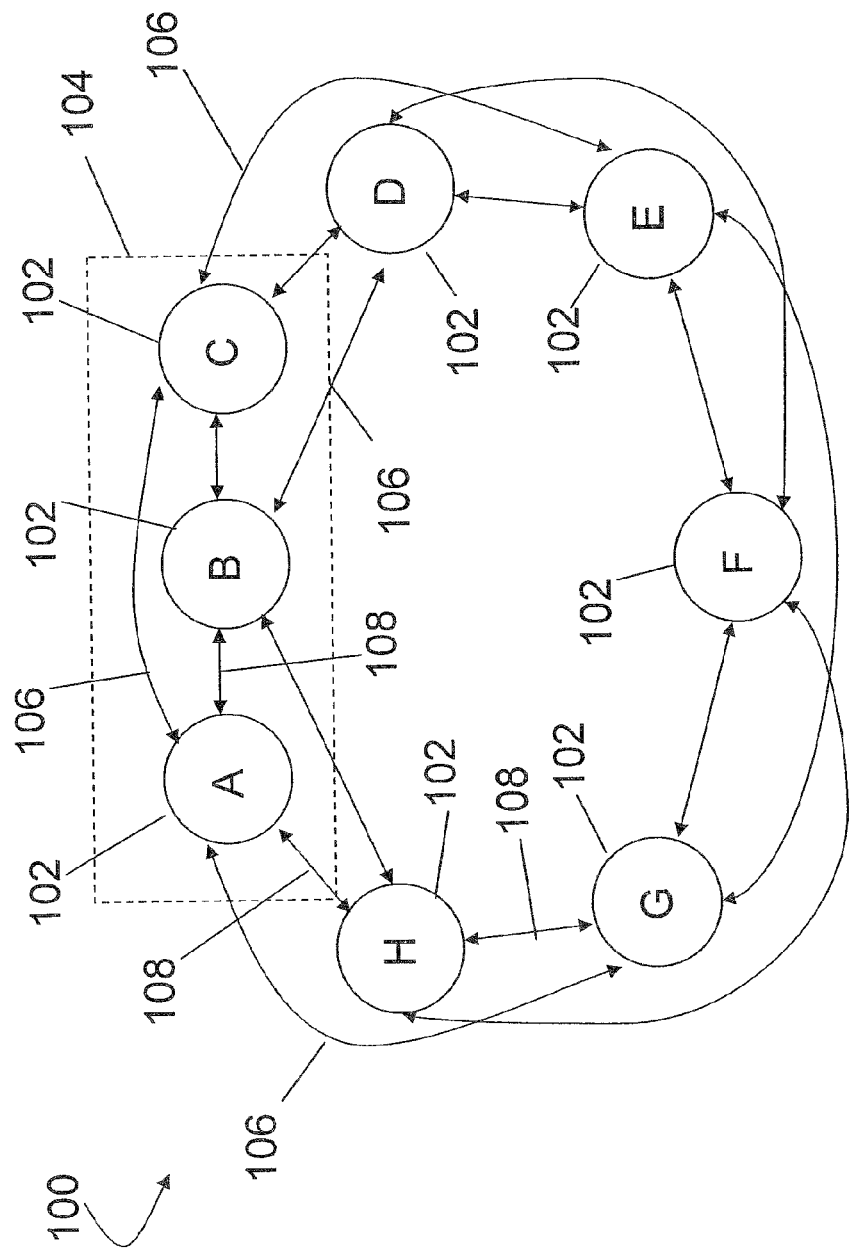
FIG. 1 is a block diagram of one embodiment of a half-duplex network.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the method presented in the drawing figures or the specification is not to be construed as limiting the order in which the individual steps may be performed. The following detailed description is, therefore, not to be taken in a limiting sense.

Figure 2:
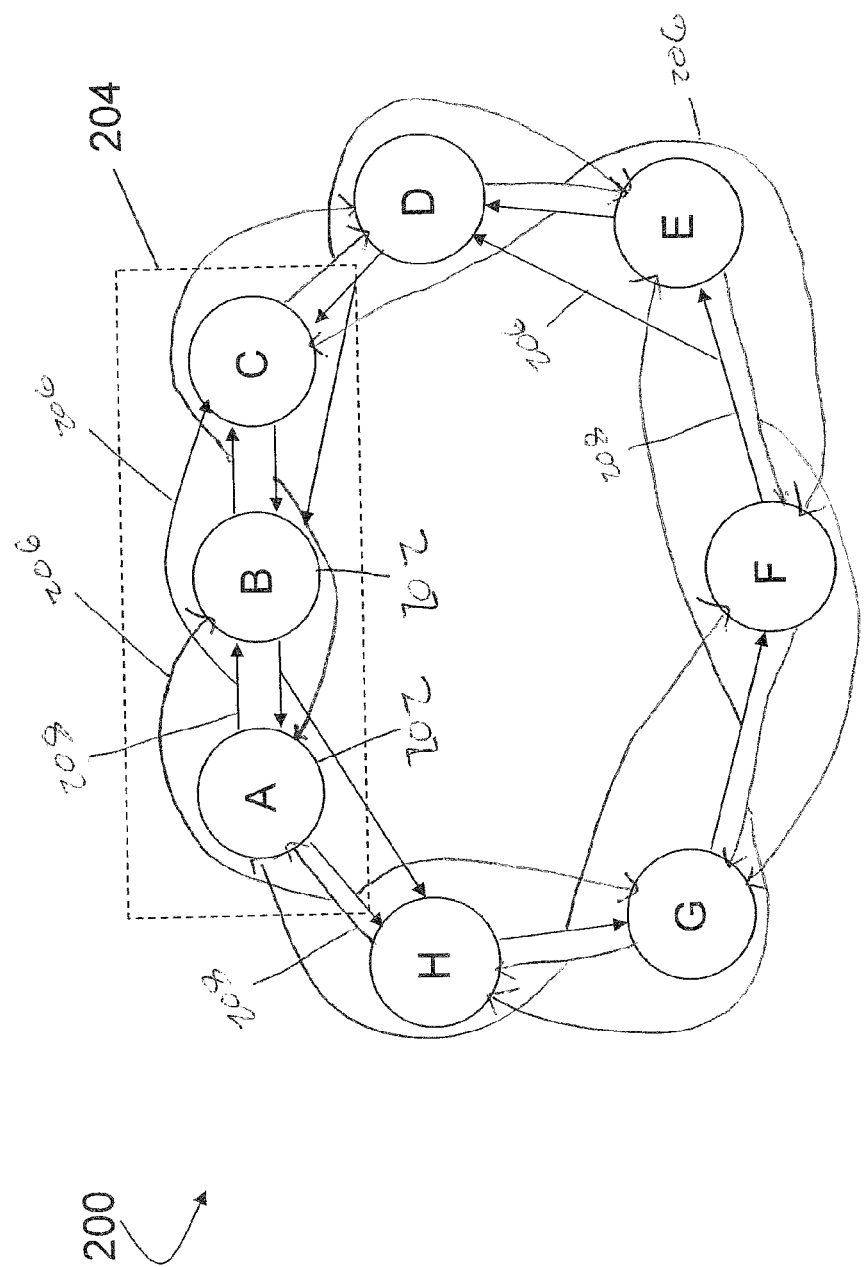
FIG. 2 is a block diagram of one embodiment of a full-duplex network.

FIG. 1 is a block diagram of one embodiment of a network 100. In this embodiment, network 100 employs a half-duplex braided-ring topology. In the particular example shown in FIG. 1, the network 100 includes eight nodes 102, which are individually referenced herein as node A through node H. Although eight nodes are shown in FIG. 1, it is to be understood that any number of nodes can be used in other embodiments. Each of the nodes 102 is coupled to its two immediate neighbors (also referred to herein as "direct neighbors") via respective direct links 108 and to its neighbors' neighbor (also referred to herein as "skip neighbors" or "skip nodes") via respective skip links 106. In the embodiment shown in FIG. 1, direct links 108 and skip links 106 are implemented using respective half-duplex bidirectional links. In other embodiments, direct links 108 and skip links 106 are implemented using respective full-duplex bi-directional links as shown in FIG. 2.

Moreover, for the sake of illustration, the details of nodes 102 are not shown; however, it is understood that the nodes 102 are implemented using suitable hardware and/or software to implement the functionality described here as being performed by the nodes 102. Each such node 102 also includes a suitable network or other interface for communicatively coupling that node to the links 108 and 106. Examples of suitable node implementations are described in the '933 Application and the '249 Application, though it is to be understood that the nodes 102 can be implemented other ways.

The links 106 and 108 are used to form at least two logical communication channels. In the particular embodiment shown in FIG. 1, the first logical communication channel comprises a communication path around the ring in a first direction (for example, in a clockwise direction), and the second logical communication channel comprises a communication path around the ring in a second direction (for example, in a counter-clockwise direction). In the embodiment, the two logical communication channels are implemented in a half-duplex manner using a single braided ring. In other embodiments, such channels are implemented in other ways. For example, in the embodiment shown in FIG. 2, the two logical communication channels are implemented using two full-duplex braided rings around the network.

In the example shown in FIG. 1, nodes A, B, and C form a triple modular redundant (TMR) set 104. TMR set 104 has two end nodes (nodes A and C in FIG. 1) and a center node (node B in FIG. 1). In this embodiment, TMR set 104 provides voted output data. That is, the local data from each of nodes A, B, and C is compared to each other and the output of the TMR set 104 as a whole is selected based on that comparison. Each of the end nodes (nodes A and C) provides the voted output data to a respective guardian node (nodes H and D in FIG. 1). A guardian node is a node that is adjacent to one of the end nodes in the TMR set 104 but that is not a member of the TMR set 104. As used herein, the terms "adjacent" and "neighboring" refer to being communicatively coupled to another node via a direct link 108. Each guardian node (H and D) is also coupled to the center node (B) of the TMR set 104 via respective skip links 106. Each guardian node compares the voted output data received from the end node to which it is coupled via a direct link 108 with a corresponding output received from the center node to which it is coupled via skip link 106.

In the embodiment described here in connection with FIG. 1, the guardian nodes H and D forward only the voted output data received from end nodes A and C, respectively, and indicate the integrity (high or low) of the forwarded output data based on the comparison with the output received from the center node. Hence, the voted output data propagates in two directions around the braided ring. In the event that each guardian node indicates low integrity (for example, due to a mismatch between the voted output data from the end nodes and the output data from the center node), each node not in TMR set 104, including guardian nodes H and D, is able to reconstitute the integrity of the forwarded voted output data by comparing the forwarded data received in both directions. That is, if the forwarded output data received from both directions is the same, the integrity of the forwarded data is viewed as high even if a mismatch was detected at each of guardian nodes H and D. The reconstituted data is trusted as having high integrity because of the voting action in TMR set 104 combined with the integrity comparisons at each node. In this way, faulty data from node B is isolated by the agreement of the voted data from nodes A and C from each direction.

In operation, each node in TMR set 104 receives data, such as sensor data, for performing calculations. When the nodes in TMR set 104 are scheduled to transmit as a part of the TMR set 104 (for example, in accordance with a TDMA schedule), the data that the nodes in TMR set 104 will transmit must be agreed upon or otherwise selected or obtained such that the outputs are bit-for-bit identical. In the particular embodiment described, each node in TMR set 104 exchanges its received data with the other members of TMR set 104 to verify that each member received the same data. Each member then performs the same calculation using the received data. Typically, the calculated result is identical from each member of TMR set 104 unless one of nodes A, B, and C is faulty. However, in certain circumstances, the calculated result from each member varies slightly even though each of nodes A, B, and C is non-faulty. For example, certain functions or processes, such as the sin function or floating point calculations, have inherent variances based on, among other things, the compiler architecture used, etc. in each node. This type of slight variance is not due to a faulty node. Therefore, in some embodiments, nodes A, B, and C perform a bounded comparison on the calculated results internally prior to transmitting. For example, if the calculated result in node A is different, but within a set limit, of the calculated result from node C, node A chooses to use the data from node C. The determination of which calculated result to use can be determined a priori.

Figure 3:
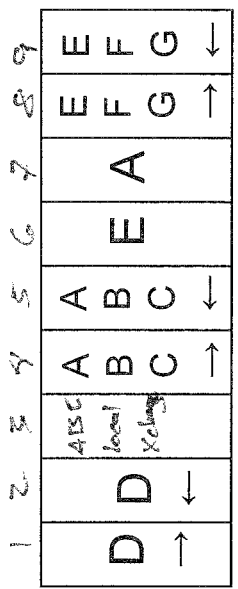
FIG. 3 is a diagram of exemplary time division multiple access schedules.
Figure 3:
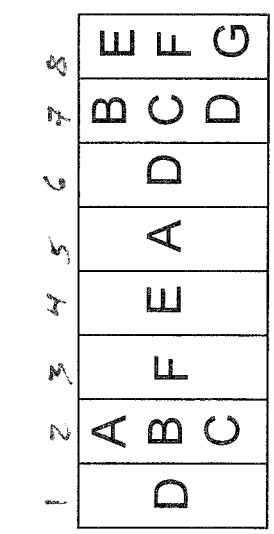

In such an embodiment when TMR set 104 is scheduled to transmit, nodes A, B, and C exchange data and vote on an output. An exemplary TDMA schedule for a half-duplex network is shown in FIG. 3. As can be seen in the exemplary schedule 304, a slot is reserved for an internal local comparison of data received at each member of TMR set 104, as shown in FIG. 3. In addition, TMR set 104, comprising nodes A, B, and C, transmits in two time slots, one slot for each of two directions. Similarly, node D transmits in two time slots allowing data to propagate completely around the ring in both directions. Alternatively, nodes E and A are only assigned one time slot. Nodes E and A transmit data in both directions in one time slot and the network uses a fault-tolerant half-duplex propagation method to prevent collision. The fault-tolerant half-duplex propagation method is described in more detail in the '305 application. In addition, as can be seen in schedule 304, more than one TMR set can be used in some embodiments as indicated by time slots for a TMR set comprising nodes E, F, and G.

When TMR set 104 is scheduled to transmit, node A receives data from node B via a corresponding direct link 108 and data from node C via a corresponding skip link 106. Node A compares its local data with the data received from nodes B and C. In particular, node A compares its local data with data from node C, its local data with the data from node B, and the data from node B with the data from node C. In this embodiment, node A compares the data by performing a bit-by-bit comparison as data is received from nodes C and B. If one of nodes B and C provides a different or faulty bit, node A blocks the different bit and outputs the majority vote (e.g. the bit on which two nodes agree). For example, in one embodiment shown in FIG. 4, the voted output for each bit is based on the majority value of each bit provided by nodes A, B, and C. As can be seen in FIG. 4, nodes A and B provide a logical value of "1" for bit #3, whereas node C provides a logical value of "0" for bit #3. The voted output for bit #3 is therefore, a logical "1". In this manner, noise or other interference which causes a faulty bit from one of nodes A, B, and C is masked by the majority vote for that bit.

The bit-by-bit comparison is performed in the hardware of node A in this embodiment. Additionally, node A sends the voted output data in near real-time. That is, node A sends the voted output on a bit-by-bit basis as the voting above is performed. However, it is to be understood that, in other embodiments, voting can be performed in other manners. For example, in some embodiments, voting is performed in software residing on machine readable media in node A. Also, in other embodiments, node A stores data received from nodes B and C and compares the data once all data has been received.

The voted output data is sent from node A to guardian node H via a corresponding direct link 108. In addition, node B sends its local data to node H over its corresponding skip link 106. Node H compares the voted output data received from node A with the local data received from node B. If node H determines there is a mismatch, it forwards the output data from node A with an indication of low integrity. If the data from node A is the same as the data from node B, node H forwards the data with an indication of high integrity. For example, an integrity bit can be appended to the forwarded data to indicate low or high integrity. Alternatively, the data can be truncated at the CRC field. In this way, the payload of the frame is passed on and the truncated CRC field indicates the low integrity.

In addition, when TMR set 104 is scheduled to transmit, node H forwards only the data received from node A over direct link 108. In this example, node H does not forward data from node B even if no data is received from node A. However, if TMR set 104 is not scheduled to transmit, node H can forward data from node B. Whether or not node H forwards data from node B is determined by the TDMA schedule.

Node H forwards the data received from node A to node G via the respective direct link 108 and to node F via the respective skip link 106. Node G also receives the voted output from node A via a corresponding skip link 106. Similar to node H, node G compares the data received via skip link 106-N to the forwarded data received via direct link 108 to determine the integrity of the received data. Node G forwards data from either node A or node H with an indication of high or low integrity based on the comparison. Therefore, if node G does not receive data over the skip link 106 or the direct link 108, node G forwards the data available. Similar comparisons are made, at each node, between the data received from the same direction over skip links 106 and direct links 108.

Once the voted output from TMR 104 has propagated in the first direction around the ring, a similar process occurs for propagating the voted output from TMR 104 in the second direction around the ring in a second time slot. For example, node C receives data from nodes A and B and votes the output as described above with regards to node A. Similarly, node B outputs its local data over a skip link 106 to guardian node D. As with guardian node H, guardian node D only forwards data received over a direct link 108 from node C. Other processing to propagate the voted output in the second direction is similar to the processing described above with regards to the first direction.

Hence, the voted output data is propagated in two directions. Nodes 102 which receive the voted output data in both directions via direct links 108 and skip links 106 also determine the integrity of the forwarded data by comparing the forwarded data received in each direction to each other. For example node F receives the forwarded output data from both nodes G and E. If node F determines that the data is the same, it reconstitutes the integrity of the forwarded data as having high integrity even if each of guardian nodes H and D had indicated that the forwarded voted output data has low integrity. For example, node F can set the integrity bit to indicate high integrity. Alternatively, node F can calculate the CRC and append the recalculated CRC to indicate the high integrity.

Notably, node F receives the voted output in both directions at different times. In particular, node F receives the voted output data in the first direction during a first time slot and the voted output data in the second direction during a second time slot. To deal with receiving data at different times, such as due to transmission delays and receiving the data in different time slots, nodes 102 are configured with de-skew logic which tracks the timing of each bit and enables the bits to be compared to the correct corresponding bit received from the opposite direction. Details of the use of de-skew logic are discussed in related co-pending application entitled "High Integrity Data Propagation in a Braided Ring," Ser. No. 10/993,933 (herein referred to as the '933 application), filed on Nov. 19, 2004, which is incorporated herein by reference.

Therefore, if the voted output data propagated in the first direction is faulty (such as due to a faulty node A), the voted output data propagated around the ring in the second direction is used if it passes integrity tests at guardian node D (which is the case since nodes B and C are non-faulty). Similarly, if the voted output data propagated in the second direction is faulty (such as due to a faulty node C), the voted output data propagated around the ring in the first direction is used if it passes integrity tests at guardian node H. If the voted output data propagated in both directions fails integrity tests at guardian nodes H and D (such as due to a faulty node B), each node 102 not in TMR set 104 reconstitutes the integrity as high integrity if the voted output in both directions matches.

FIG. 2 is a block diagram of one embodiment of a network 200. Network 200 is similar to network 100 except that direct links 208 and skip links 206 are full-duplex bi-directional links. Hence, the voted output is transmitted from end nodes A and C and propagated around the ring in both directions substantially simultaneously. Nodes 202 also use de-skew logic to properly correlate and compare bits of the voted output. However, each node 202 not in TMR set 204 performs integrity comparisons on data from each direction at substantially the same time as it performs integrity reconstitution comparisons on data from opposite directions. Hence, TMR set 204 only needs one TDMA time slot to complete transmission. Processing in nodes of network 200 is similar to the processing in nodes of network 100 and described in more detail below.

An exemplary TDMA schedule of a full-duplex network is shown in FIG. 3. As can be seen in schedule 302, only one TDMA time slot is needed for the TMR set comprising nodes A, B, and C. Also, as can be seen in schedule 302, nodes B and C are both member of two different TMR sets. The first TMR set comprises nodes A, B, and C; while the second TMR set comprises nodes B, C, and D. In some embodiments, nodes B and C are configured a priori to be members of the two TMR sets. In other embodiments, the TMR set comprising nodes A, B, and C is shifted due to a faulty node A. Hence, a faulty node A is replaced by shifting to include node D in the second TMR set.

Consequently, such embodiments provide high integrity reliability through a TMR set while removing overhead common to typical TMR configurations. For example, TMR sets 104 and 204 do not need additional voting inter-stages to vote on the output of each of the members of the TMR sets as in typical TMR configurations. In particular, voting is done at the end nodes and integrity comparisons are done at guardian nodes and around the ring as the voted output data is propagated. Similarly, by performing bit-by-bit comparisons in hardware as bits are received in the end nodes software overhead associated with voting (e.g. memory, processing power, etc.) can be reduced and/or eliminated.

Additionally, in embodiments implemented in time division multiple access (TDMA) networks, the number of TDMA time slots required for the voting is reduced. For example, a typical TMR configuration requires 3 TDMA time slots/transmissions to share/observe the output from each member of the TMR set. However, in embodiments using full-duplex bi-directional links as in network 200, only 1 TDMA time slot/transmission is required. Similarly, in embodiments using half-duplex bi-directional links as in network 100, only 2 TDMA time slots/transmissions are required.

In other embodiments, the data that the nodes in the TMR set 104 transmit (when transmitting as part of the TMR set 104) is agreed upon or otherwise selected or obtained in other ways. Moreover, in the embodiments described above in connection with FIGS. 1 and 2, the nodes 102 of the TMR set 104 are communicatively coupled to one another using the same type of communication links used to communicatively couple the TMR et 104 to the other nodes in the network 100 and the other nodes to one another. In other embodiments, the nodes 102 of the TMR set 104 are communicatively coupled to one another using links that are different than the links used to communicatively couple the TMR set 104 to the other nodes of the network and the other nodes to one another.

Figure 5:
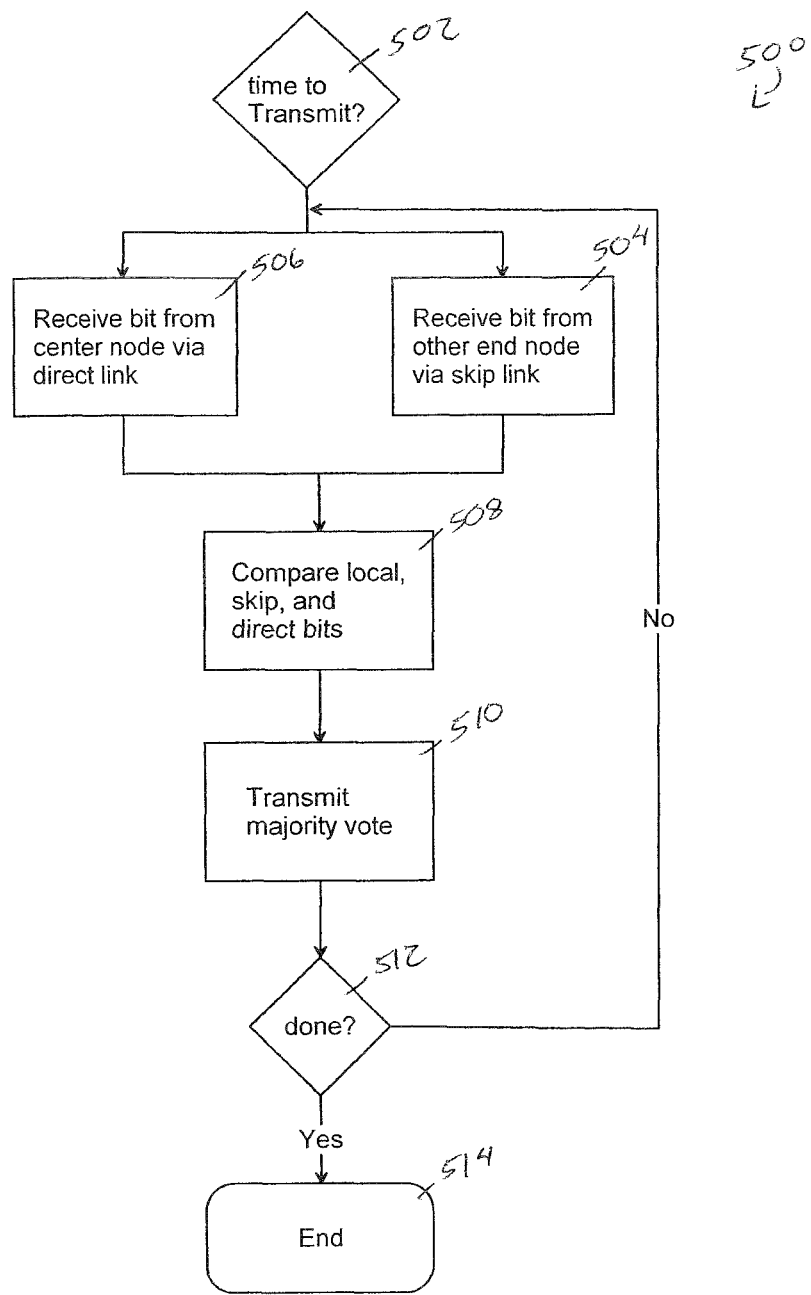
FIG. 5 is a flow chart of one embodiment of a method of voting in an end node.

FIG. 5 is a flow chart of one embodiment of a method 500 of voting an output in an end node (for example, end nodes A and C above). At 502, it is determined when a TMR set (for example, TMR set 104) is to transmit a voted output. When it is time to transmit a voted output, a first end node receives a bit of local data from a second end node via a skip link (for example, skip link 106) at 504. Additionally, the first end node receives a bit of local data from a center node via a direct link (for example, direct link 108) at 506. As each bit is received from the second end node and the center node, the first end node compares each received bit with a corresponding bit in the local data of the first end node at 508. The comparison determines a majority vote for each bit as described above with reference to FIG. 4. Once the majority vote is determined, the first end node transmits the majority vote on its output direct link and output skip link in a first direction at 510. At 512, it is determined if all bits of the local data have been received and processed. If there are remaining bits, method 500 returns to 504 and 506 to receive another bit from the second end node and the center node. If all bits have been received and processed, method 500 ends at 514. It is to be noted that a similar process occurs in the second end node.

Figure 6:
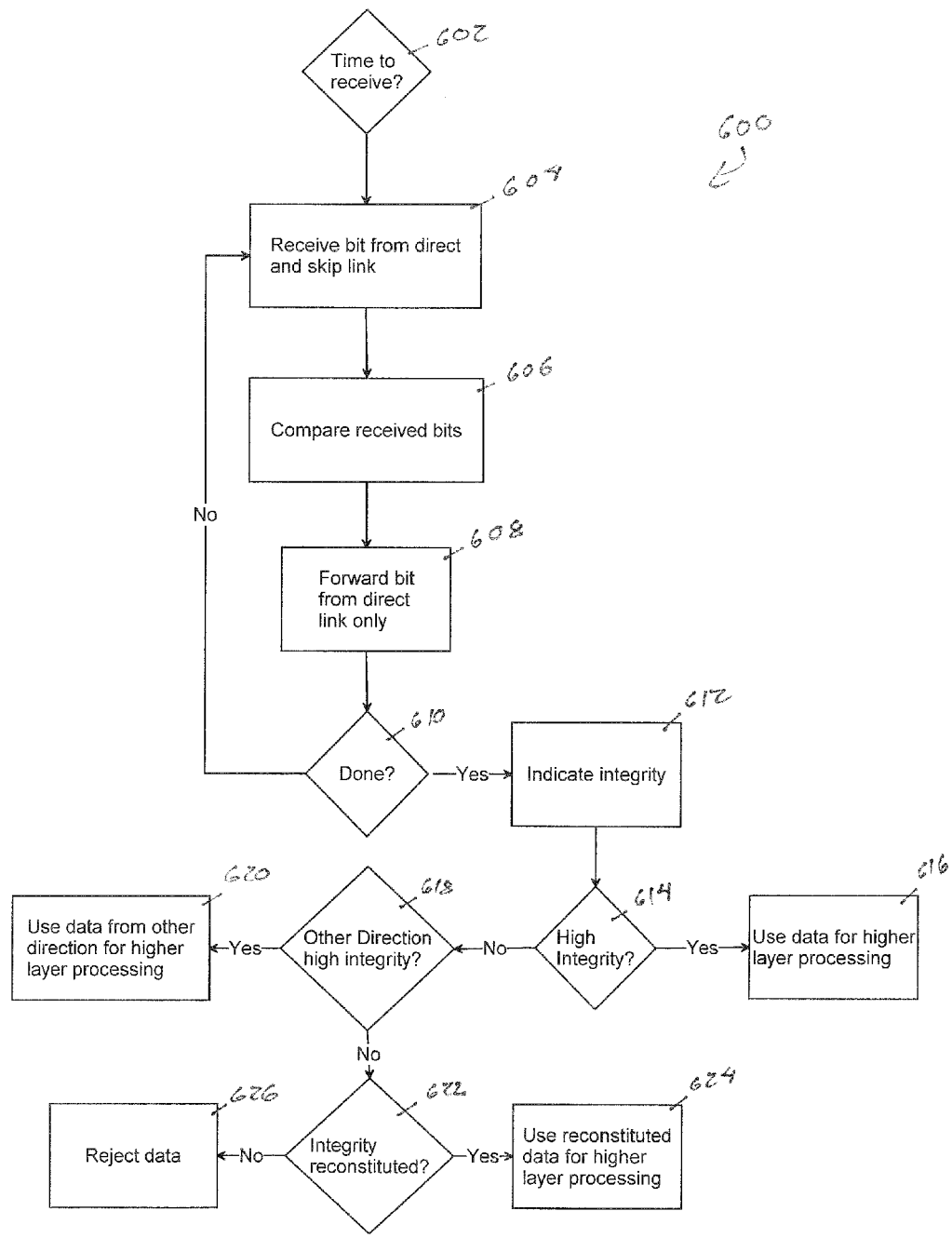
FIG. 6 is a flow chart of one embodiment of a method of processing data in a guardian node.

FIG. 6 is a flow chart of one embodiment of a method 600 processing data in a guardian node (for example, guardian nodes H and D). At 602, it is determined when the guardian node is to receive voted output data from a TMR set. When it is time to receive voted output data from a TMR set, the guardian node receives a bit of the voted output data from an end node via a direct link at 604. Also at 604, the guardian node receives a bit of local data from the center node via a skip link. At 606, the guardian node compares the bit received via the direct link with the bit received via the skip link to determine if they match. The guardian node then forwards only the bit from the direct link at 608. At 610, the guardian node determines if all bits have been received and processed. If processing has not finished, method 600 returns to 604 to receive another bit of voted output data from the end node via the direct link and another bit of local data from the center node via the skip link.

If processing has finished, the guardian node indicates, at 612, the integrity of the forwarded bits at the end of the message based on whether or not any mismatch of bits were identified at 606. The guardian node indicates the integrity by sending information (for example, an appended or shared integrity field) indicating that whether or not the bits received over the direct link matched the bits received over the skip link. For example, in one embodiment, the information indicative of the results of the comparison comprises an appended integrity status field that the guardian node appends to the frame of data forwarded by the guardian node. In another embodiment, a shared integrity field is included at the end of the frame of voted output data received from the end node. In such an embodiment, the guardian node sets the shared integrity field to a "negative" value (for example, a value of "0") if the comparison indicates that the bits of voted output data do not match the corresponding bits of local data from the center node. Otherwise, the guardian node does not alter the shared integrity field if the comparison indicates that the bits match.

At 614, the guardian node determines if the voted output data has a high integrity (in other words, the voted output data from the end node matches the local data from the center node). If the voted output data has high integrity, the guardian node uses the voted output data for higher layer processing at 616. If the voted output data does not have high integrity, the guardian node determines if data received from the opposite direction (in other words, voted output data originating from the other end node) has high integrity at 618. The integrity of the data from the other direction is determined by performing the functions described at blocks 604 and 606 on the data received from a neighbor node and skip node in the second direction. Also, the integrity is based on an indication of integrity as determined by the other end node in the second direction.

If the voted output data from the other direction has high integrity, the guardian node uses the data from the other direction for higher layer processing at 620. If the voted output data from the other direction does not have high integrity, the guardian node determines if the integrity of the data can be reconstituted based on the data received in both directions at 622. An exemplary method of reconstituting integrity is described below with regards to FIG. 8. If the integrity of the data can be reconstituted, the guardian node uses the reconstituted data for higher layer processing at 624. If the integrity of the data cannot be reconstituted, the guardian node rejects the data at 626.

Figure 7:
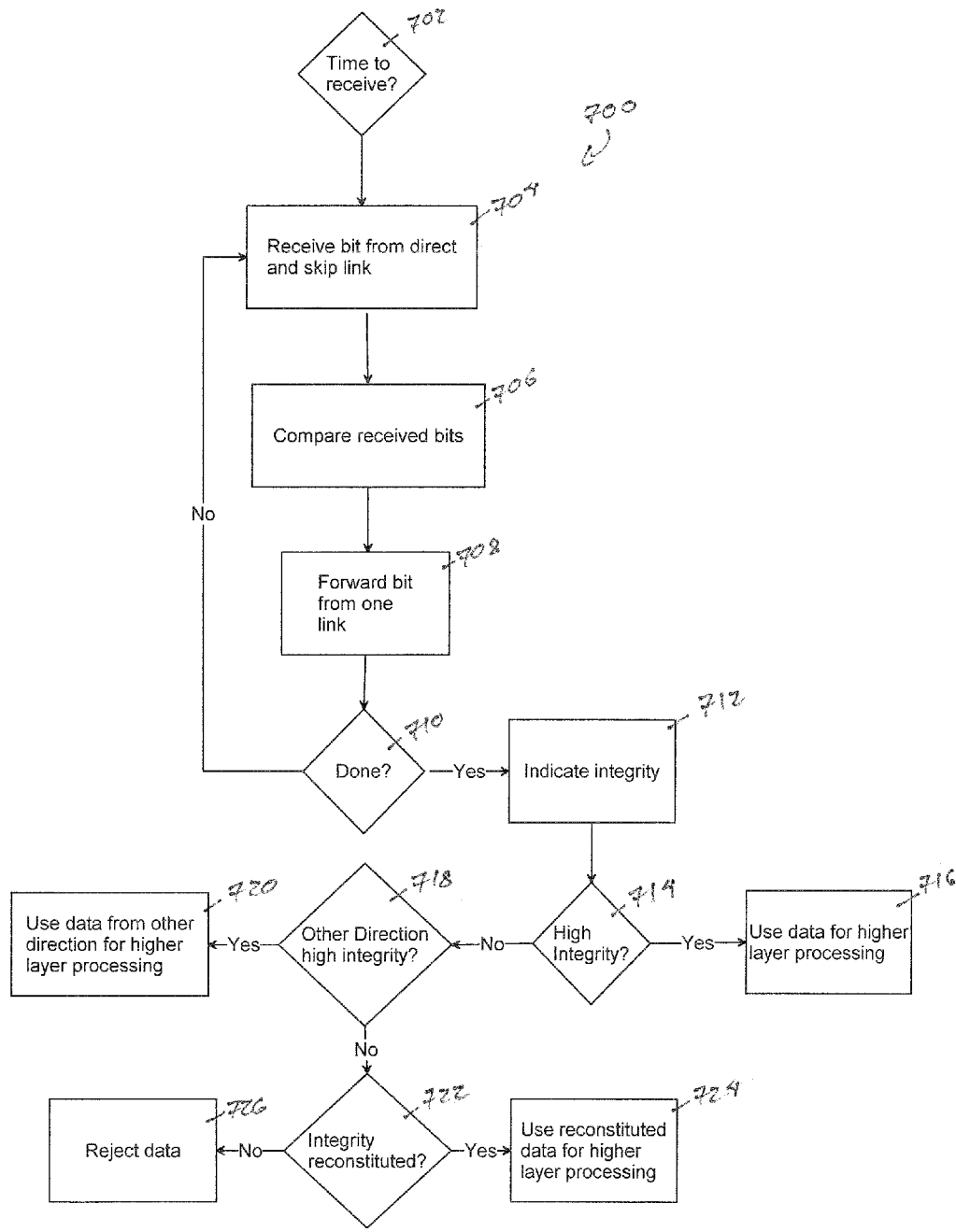
FIG. 7 is a flow chart of one embodiment of a method of processing data in receiving nodes.

FIG. 7 is a flow chart of one embodiment of a method 700 processing data in a receiving node. A receiving node is a node that is not a guardian node nor in the TMR set (for example, TMR set 104) currently scheduled to transmit. At 702, it is determined when the receiving node is to receive data according to a transmission schedule. When it is time to receive data, the receiving node receives a bit of the forwarded data from a neighbor node via a direct link at 704. Also at 704, the receiving node receives a bit of forwarded data from a skip node via a skip link from the same direction as the neighbor node. At 706, the receiving node compares the bit received via the direct link with the bit received via the skip link to determine if they match. The receiving node then forwards the bit from one link only at 708. For example, in this embodiment the node is configured to forward the bit from the direct link by default. However, in the event that no bit is received from the direct link, the receiving node can forward the bit from the skip link. In addition, in some embodiments, higher level diagnostics and fault isolation techniques are used to determine which link (direct or skip) is used to forward bits. At 710, the receiving node determines if all bits have been received and processed (for example, if the frame has finished). If processing has not finished, method 700 returns to 704 to receive another bit of data from the direct link and another bit of data from the skip link.

If processing has finished, the receiving node indicates, at 712, the integrity of the forwarded bits based on whether or not any mismatch of bits were identified at 706. The receiving node indicates the integrity by sending information (for example, an appended or shared integrity field) indicating that whether or not the bits received over the direct link matched the bits received over the skip link. For example, in one embodiment, the information indicative of the results of the comparison comprises a one-bit, appended integrity field that the receiving node appends to the frame of data forwarded by the receiving node. In another embodiment, a shared integrity field is included at the end of each frame of forwarded data received by the receiving node. In such an embodiment, the receiving node sets the shared integrity field to a "negative" value (for example, a value of "0") if the comparison indicates that the bits of voted output data do not match the corresponding bits of local data from the center node. Otherwise, the receiving node does not alter the shared integrity field if the comparison indicates that the bits match.

At 714, the receiving node determines if the data has a high integrity (in other words, the data from the neighbor node matches the data from the skip node). If the voted output data has high integrity, the receiving node uses the received data for higher layer processing at 716. If the voted output data does not have high integrity, the receiving node determines if data received from the opposite direction (in other words, voted output data originating from the other direction) has high integrity at 718. The integrity of the data from the other direction is determined by performing the functions described at block 704 and 706 on the data received a neighbor node and skip node from the second direction. Also, the integrity it based on an indication of integrity as determined by the end node in the second direction.

If the data from the other direction has high integrity, the receiving node uses the data from the other direction for higher layer processing at 720. If the data from the other direction does not have high integrity, the receiving node determines if the integrity of the data can be reconstituted based on the data received in both directions at 722. An exemplary method of reconstituting integrity is described below with regards to FIG. 8. If the integrity of the data can be reconstituted, the receiving node uses the reconstituted data for higher layer processing at 724. If the integrity of the data cannot be reconstituted, the receiving node rejects the data at 726.

Figure 8:
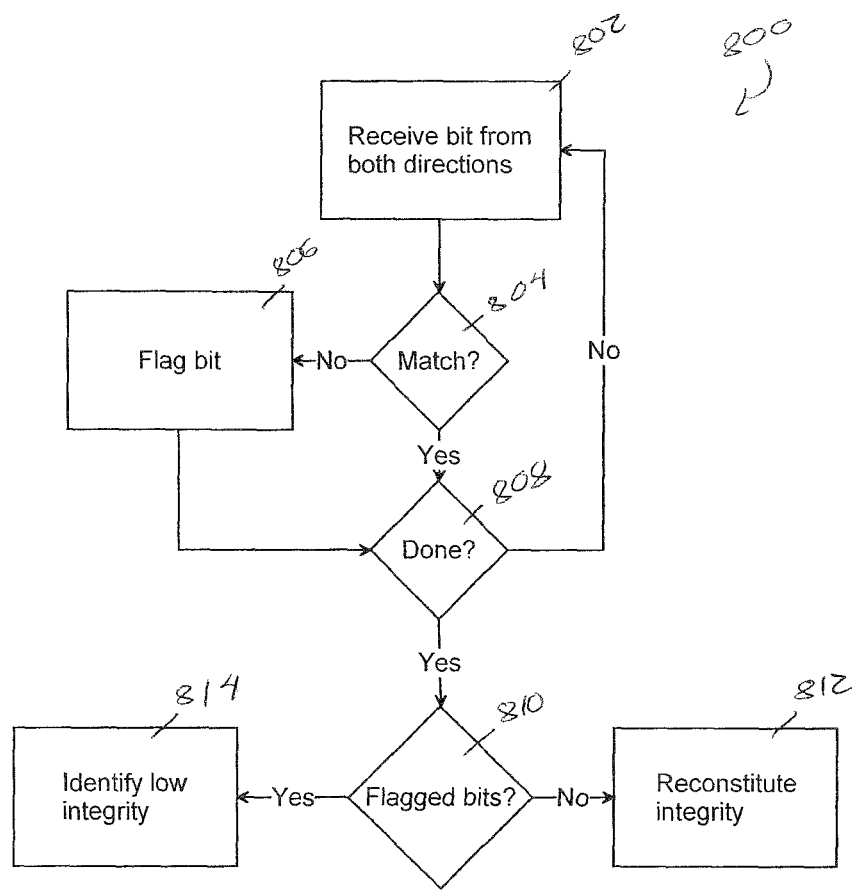
FIG. 8 is a flow chart of one embodiment of a method of reconstituting integrity.

FIG. 8 is a flow chart of one embodiment of a method 800 of reconstituting integrity. At 802, a bit is received from a first direction and from a second direction. In a half-duplex network such as network 100, a bit is received from a first direction in one timeslot and from the second direction in a second timeslot. De-skew logic is used to correlate the bits from each direction with each other. Similarly, in a full-duplex network such as network 200, de-skew logic is used to correlate bits from each direction with each other thereby compensating for any difference in transmission delays between the two directions.

At 804, the bit from the first direction is compared to the bit from the second direction to determine if they match. In this embodiment, if the bits do not match, the bit is flagged as an invalid bit at 806. At 808, it is determined if more bits need to be processed (for example if the frame has completed or not). If more bits need to be processed, method 800 returns to 802 where another bit is received from both directions for comparison. If no more bits need to be processed, it is determined if any of the bits were invalid at 810. If none of the bits were flagged as invalid (indicating that the data matched in both directions), the integrity of the data is reconstituted at 812. However, if one or more bits were flagged as invalid, the data is identified as having low integrity at 814.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A network comprising:
   a first plurality of links;
   a second plurality of links and
   a plurality of nodes, each node communicatively coupled to two neighbor nodes using the first plurality of links and to two skip nodes using the second plurality of links;
   wherein, three neighboring nodes of the plurality of nodes form a triple modular redundant (TMR) set having a first end node, a second end node, and a center node, the first end node configured to transmit output data in a first direction and the second end node configured to transmit output data in a second direction; and
   wherein the plurality of nodes further comprises a first guardian node adjacent the first end node and a second guardian node adjacent the second end node, wherein each of the first and second guardian nodes is configured to forward only data received from its respective adjacent end node, wherein each of the first and second guardian nodes is further configured to indicate integrity of the forwarded data based on a comparison of data received from its respective adjacent end node and the center node;
   wherein the nodes of the plurality of nodes that form the TMR set, the first guardian node, and the second guardian node are determined according to a schedule;
   wherein the plurality of nodes are configured to shift the TMR set such that a faulty node in the TMR set is replaced by another node of the plurality of nodes.

2. The network of claim 1, wherein the center node is configured to transmit its local data in both the first and second directions.

3. The network of claim 1, wherein each of the plurality of nodes not in the TMR set is configured to compare the forwarded data received from a neighbor node with the forwarded data received from a skip node in the same direction to determine the integrity of the forwarded data.

4. The network of claim 1, wherein each of the plurality of nodes not in the TMR set is configured to compare the forwarded data from the first guardian node in the first direction with the forwarded data from the second guardian node in the second direction and to reconstitute the integrity of the forwarded data if the data from the first guardian node matches the data from the second guardian node.

5. The network of claim 1, wherein each of the first and second end nodes votes the output data by selecting a majority vote for each bit of the output data as each bit is received in the first and second end nodes.

6. The network of claim 1, wherein the first plurality of links and the second plurality of links comprise one of full-duplex bi-directional links and half-duplex bi-directional links.

7. A triple modular redundant (TMR) set of nodes in a braided ring network, the TMR set comprising:
   a first end node;

a second end node; and
a center node;
wherein, the center node is communicatively coupled to the first end node and the second end node via direct links and the first end node is communicatively coupled to the second end node via skip links;
wherein, the first end node transmits an output in a first direction to nodes outside the TMR set, the second end node transmits an output in a second direction to nodes outside the TMR set, and the center node transmits its local data in the first and second directions to nodes outside the TMR set; and
wherein each of the first and second end nodes is configured to transmit a voted output when scheduled to transmit as a member of the TMR set, and to transmit its local data when not scheduled to transmit as a member of the TMR set.

8. The triple modular redundant set of claim 7, wherein the first end node transmits an output in the first direction during a first time slot and the second end node transmits an output in the second direction during a second time slot.

9. The triple modular redundant set of claim 7, wherein each of the first and second end nodes is configured to vote the output transmitted to nodes outside the TMR set by selecting a majority vote for each bit of the output data as each bit is received in the first and second end nodes.

10. A method comprising:
receiving, in a first end node of a triple modular redundant (TMR) set, data from a second end node of the TMR set;
receiving, in the first end node, data from a center node of the TMR set;
selecting an output, in the first end node, based on the data from the second end node, the data from the center node, and data from the first end node;
transmitting the selected output from the first end node to a first guardian node in a first direction; and
transmitting the data from the center node to the first guardian node in the first direction;
wherein the first end node, the second end node, and the center node are each configured to perform the same calculations on input data when scheduled to transmit as part of the TMR set;
wherein the selected output from the first end node and the data from the center node are transmitted in the same time slot.

11. The method of claim 10, further comprising:
comparing the data from the center node with the selected output from the first end node in the first guardian node to determine integrity of the first end node's selected output.

12. The method of claim 11, further comprising:
forwarding only the first end node's selected output from the first guardian node.

13. The method of claim 12, further comprising:
sending an indication of the integrity of the first end node's selected output from the first guardian node.

14. The method of claim 13, further comprising one of:
appending an integrity field to the selected output forwarded by the first guardian node;
updating a shared integrity field included at the end of the first end node's selected output; and
truncating the first end node's selected output after payload data in the first end node's selected output to indicate low integrity.

15. The method of claim 10, further comprising:
receiving, in the second end node, the data from the first end node;
receiving, in the second end node, the data from the center node;
selecting an output, in the second end node, based on the data from the first end node, the data from the center node, and the data from the second end node;
transmitting the selected output from the second end node to a second guardian node in a second direction;
transmitting the data from the center node to the second guardian node in the second direction;
comparing the data from the center node with the selected output from the second end node in the second guardian node to determine integrity of the second end node's selected output; and
forwarding only the second end node's selected output from the second guardian node.

16. The method of claim 15, further comprising:
using the first end node's selected output for additional processing if the first end node's selected output has high integrity; and
if the first end node's selected output does not have high integrity, using the second end node's selected output for additional processing if the second end node's selected output has high integrity.

17. The method of claim 16 further comprising:
if the second end node's selected output does not have high integrity, comparing the forwarded selected output from the first end node in the first direction with the forwarded selected output from the second end node in the second direction; and
if the forwarded selected output from the first end node in the first direction is the same as the forwarded selected output from the second end node in the second direction, reconstituting the integrity of each forwarded selected output.

18. A network comprising:
a plurality of nodes communicatively coupled to one another over first and second logical communication channels;
wherein each of the plurality of nodes is communicatively coupled to respective first and second neighbor nodes and respective first and second skip nodes;
wherein the plurality of nodes comprises a redundant set of nodes comprising a center node, and first and second end nodes that comprise the neighbor nodes of the center node;
wherein the first end node, the second end node, and the center node are each configured to perform the same calculations on input data as the other nodes in the redundant set when scheduled to transmit data as part of the redundant set;
wherein the plurality of nodes further comprises a first guardian node and a second guardian node, the first guardian node adjacent the first end node and the second guardian node adjacent the second end node; wherein each of the first and second guardian nodes is configured to forward only data received from its respective adjacent end node;
wherein when the redundant set transmits first data:
(A) the redundant set transmits the first data on both the first and second logical communication channels, wherein the first end node and the center node transmit the first data in a time slot shared by the first end node and the center node, and the second end node and the center node transmit the first data in a time slot shared by the second end node and the center node;
(B) each of the plurality of nodes that is not in the redundant set forwards along the first logical communication channel any data received on the first logical communication channel from a respective first neighbor node and forwards along the second logical communication channel any data received on the second logical communication channel from a respective second neighbor node;

(C) at least one of the plurality of nodes that is not in the redundant set determines integrity of data received from the redundant set based on at least:
  (i) a comparison of data received on the first logical communication channel from a respective first neighbor node with data received on the first logical communication channel from a respective first skip node;
  (ii) a comparison of data received on the second logical communication channel from a respective second neighbor node with data received on the second logical communication channel from a respective second skip node; and
  (iii) a comparison of data received on the first logical communication channel from one of the respective first neighbor node and the respective first skip node with data received on the second logical communication channel from one of the respective second neighbor node and the respective second skip node.

19. The network of claim 18, wherein each of the first and second end nodes votes the first data by selecting a majority vote for each bit of the output data as each bit is received in the first and second end nodes.

20. The network of claim 18, wherein:
  (i) the comparison of data received on the first logical communication channel from the respective first neighbor node with data received on the first logical communication channel from the respective first skip node comprises a bit-for-bit comparison;
  (ii) the comparison of data received on the second logical communication channel from the respective second neighbor node with data received on the second logical communication channel from the respective second skip node comprises a bit-for-bit comparison; and
  (iii) the comparison of data received on the first logical communication channel from one of the respective first neighbor node and the respective first skip node with data received on the second logical communication channel from one of the respective second neighbor node and the respective second skip node comprises a bit-for-bit comparison.

* * * * *